(12) United States Patent
Hamlin et al.

(10) Patent No.: US 11,544,414 B2
(45) Date of Patent: Jan. 3, 2023

(54) SECURE WAKE-ON OF A COMPUTING DEVICE

(71) Applicant: Dell Products L. P., Round Rock, TX (US)

(72) Inventors: Daniel L. Hamlin, Round Rock, TX (US); Janardan Pradeep Gopal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 917 days.

(21) Appl. No.: 16/266,538

(22) Filed: Feb. 4, 2019

(65) Prior Publication Data
US 2020/0250348 A1   Aug. 6, 2020

(51) Int. Cl.
| | |
|---|---|
| G06F 21/81 | (2013.01) |
| G06F 1/3215 | (2019.01) |
| G06F 1/3296 | (2019.01) |
| G06F 21/34 | (2013.01) |
| G06F 9/4401 | (2018.01) |
| G06F 21/31 | (2013.01) |
| G06F 21/57 | (2013.01) |

(52) U.S. Cl.
CPC ............ *G06F 21/81* (2013.01); *G06F 1/3215* (2013.01); *G06F 1/3296* (2013.01); *G06F 21/34* (2013.01); *G06F 9/4401* (2013.01); *G06F 9/4418* (2013.01); *G06F 21/31* (2013.01); *G06F 21/575* (2013.01); *Y02D 10/00* (2018.01)

(58) Field of Classification Search
CPC ...... G06F 21/81; G06F 1/3215; G06F 1/3296; G06F 21/34; G06F 21/575; G06F 9/4401; G06F 21/31; G06F 9/4418; Y02D 10/00
USPC .......................................... 713/3, 323; 726/2
See application file for complete search history.

(56) References Cited

U.S. PATENT DOCUMENTS 5,887,131 A * 3/1999 Angelo .................. G06F 21/34
                                                          726/20
8,539,246 B2 * 9/2013 Seethaler ................ G06F 21/78
                                                          713/182
(Continued)

OTHER PUBLICATIONS

P.Shuanghe et al. Enhancing PC Security with a U-Key, IEEE Security & Privacy (vol. 4, Issue: 5, pp. 34-39) (Year: 2006).*
(Continued)

*Primary Examiner* — Ji H Bae
(74) *Attorney, Agent, or Firm* — Egan, Enders & Huston LLP.

(57) ABSTRACT

In some examples, an embedded controller of a computing device may detect, when the computing device is in a low-power state, that a smartcard has been connected to a port of the computing device or that data has been received from an input device (e.g., keyboard or biometric input device) connected to the computing device. For the smartcard, the embedded controller may use a card driver to read data stored on the smartcard. The embedded controller may compute a hash value based on the data read from the smartcard or received from the input device. If the hash value matches a previously stored hash value, then the embedded controller may initiate a boot-up process of the computing device. If the hash value does not match the previously stored hash value, then the embedded controller may cause the computing device to remain in the low-power state.

19 Claims, 6 Drawing Sheets

(56) References Cited

U.S. PATENT DOCUMENTS

| | | | |
|---|---|---|---|
| 8,763,112 B2* | 6/2014 | Prakash | G06F 21/31 726/18 |
| 9,104,423 B2* | 8/2015 | Ahmad | G06F 1/3209 |
| 9,674,194 B1* | 6/2017 | McClintock | G06F 21/604 |
| 2002/0174353 A1* | 11/2002 | Lee | G06F 21/575 713/193 |
| 2005/0114716 A1* | 5/2005 | O | G06F 1/3215 713/300 |
| 2006/0043164 A1* | 3/2006 | Dowling | H04M 7/0075 235/375 |
| 2008/0148046 A1* | 6/2008 | Glancey | G06F 21/34 713/156 |
| 2008/0222423 A1* | 9/2008 | Rodriguez | G06F 21/31 713/182 |
| 2010/0133342 A1* | 6/2010 | Singh | G06F 21/34 235/439 |
| 2013/0007873 A1* | 1/2013 | Prakash | G06F 21/31 726/17 |
| 2014/0033302 A1* | 1/2014 | Hillis | G06F 21/121 726/21 |
| 2014/0053256 A1* | 2/2014 | Softer | G06F 21/85 726/9 |
| 2014/0129818 A1* | 5/2014 | Li | G06F 21/79 713/2 |
| 2015/0082061 A1* | 3/2015 | Ramirez | G06F 1/1632 713/323 |
| 2018/0004541 A1* | 1/2018 | Jang | G06F 9/4418 |

OTHER PUBLICATIONS

D.Cromer et al. Wake on Smartcard, IBM Technical Disclosure Bulletin (vol. 40 No. Nov. 11, 1997) (Year: 1997).*

Zibreg, "19 Useful Mac Startup Key Combinations You Should Familiarize Yourself With", Web.archive.org, May 23, 2016, 5 pgs.

Sunjindude, "Can You Power On Via A Wireless USB Keyboard?", Internet User posts made in 2013, 5 pgs.

HP, Keyboard Power-On Function (Remote Power-On), Internet User posts made in 2018, 7 pgs.

* cited by examiner

SECURE WAKE-ON OF A COMPUTING DEVICE

BACKGROUND OF THE INVENTION

Field of the Invention

This invention relates generally to providing a secure way to wake (e.g., initiate booting of) a device based on input received from a universal serial bus (USB) port of the device.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To conserve power during non-business hours, corporate computing devices (e.g., information handling systems) may be placed in a low-power mode (e.g., hibernation or shutdown). Some types of corporate computing devices may be relatively inaccessible (e.g., mounted on a wall, mounted in a secure room, or the like), thereby preventing them from being manually powered on (e.g., by a user pressing a power button on the device). Such inaccessible computing devices may be powered on using a wake-on-USB feature of a basic input/output system (BIOS) of the computing devices. However, there are several issues with using a wake-on-USB feature. First, wake-on-USB is not secure, enabling an unauthorized user to wake a particular computing device. Second, the computing device can be powered-on accidently, e.g., by cleaning staff accidently pressing a key on a USB keyboard or the like.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As a first example, a user may enter a BIOS user interface (UI) of a computing device and enable a "secure wake-on using smartcard" setting of the BIOS. The BIOS may determine that a smartcard has been connected to a port of the computing device, load a card driver (e.g., a chip card interface device (CCID) driver), and read, using the card driver, at least a portion of data (e.g., a public certificate, a card identifier that uniquely identifies the smartcard, or both) stored on the smartcard. The BIOS may compute a preliminary hash value based at least in part on the data and store the preliminary hash value in a non-volatile memory of the computing device to create a stored hash. When the computing device is in a low-power state, an embedded controller of the computing device may determine that a smartcard has been connected to a port of the computing device, load the card driver, and read, using the card driver, at least a portion of the data stored on the smartcard. The embedded controller may compute a hash value based at least in part on the data and compare the hash value to the stored hash. If the hash value matches the previously stored hash, then the embedded controller may instruct the BIOS to initiate a boot-up process of the computing device to transition the computing device from the low-power state to a power-on state. If the hash value does not match the previously stored hash, then the embedded controller may keep the computing device in the low-power state.

As a second example, a user may enter a BIOS UI of the computing device and enable (e.g., in response to a user selection) a "secure wake-on using at least one input device" setting. The BIOS may (e.g., in response to prompting the user to provide input) receive preliminary input data from the at least one input device that is connected to at least one port of the computing device. The BIOS may compute a preliminary hash value based at least in part on the preliminary input data and store the preliminary hash value in a non-volatile memory of the computing device to create a stored hash. For example, the at least one input device may include a keyboard and the input data may include a password comprised of a series of key presses of the keyboard. The at least one input device may include a retinal scanner and the input data may include retinal scan data. The at least one input device may include a fingerprint reader and the input data may include fingerprint scan data. The at least one input device may include a facial recognition scanner and the input data may include facial data. An embedded controller of the computing device may determine that the computing device is in a low-power state and determine that input data has been received from the at least one input device that is connected to the at least one port of the computing device. The embedded controller may compute a hash value based at least in part on the input data and perform a comparison of the hash value to the previously stored hash. If the hash value matches (e.g., based on the comparison) the previously stored hash, then the operations may include initiating a boot-up process of the computing device. For example, the boot-up process may transition the computing device from the low-power state to a power-on state. If the hash value does not match (e.g., based on the comparison) the previously stored hash, then the operations may include resuming the low-power state.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
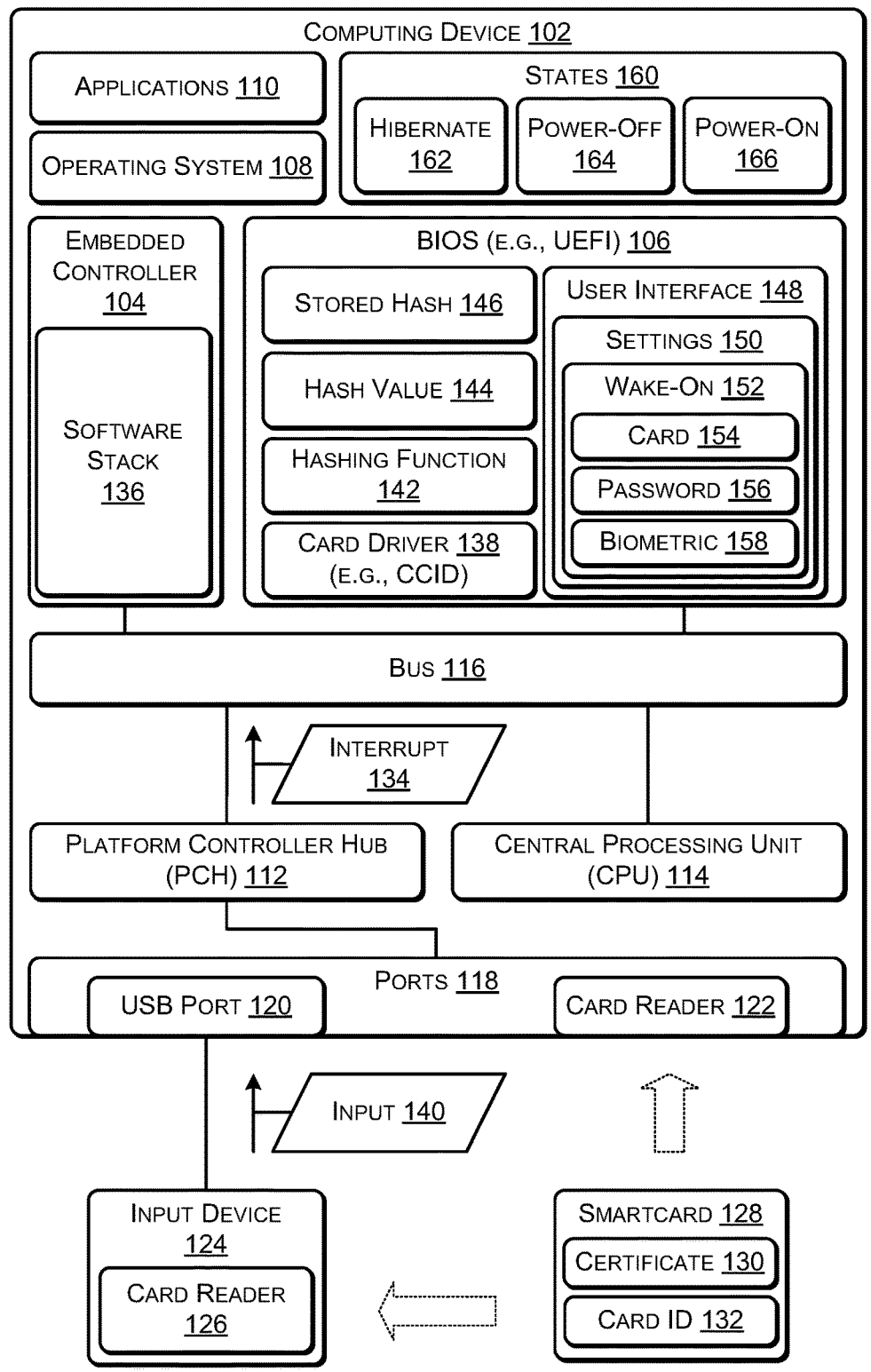
FIG. 1 is a block diagram of a system that includes computing device that can be booted based on input received from a port of the computing device, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a computing device to be woken (e.g., initiate a boot process) in a secure manner using input from a port, such as a universal serial bus (USB) port or a card reader, of the computing device. When a user attempts to wake (initiate a boot process of) the computing device from a low-power state, such as a state of hibernation or a power-off state, the computing device may initiate authentication of credentials provided by the user. If the computing device is able to authenticate the user's credentials, the computing device may proceed to initiate the boot process and wake the computing device. If the computing device is unable to authenticate the user's credentials, the computing device may remain in the low-power state.

For example, a user may enable a "wake-on smartcard" feature of a basic input/output system (BIOS), such as a Unified Extensible Firmware Interface (UEFI), of a computing device. The BIOS may prompt the user to insert the smartcard into a port (e.g., a USB port, a card reader port, or the like) of the computing device. After the BIOS determines that the smartcard has been inserted, the BIOS may load a driver, such as a chip card interface device (CCID) driver (or similar), and read contents of the smartcard. The CCID driver is a USB protocol that enables a smartcard to be connected to a computing device via a card reader using a standard USB interface, without the need for a unique card reader. The smartcard may be used as a security token for authentication. In some cases, the smartcard may use a standard USB dongle form factor and may contain a card, such as, a subscriber identity module (SIM) card or Secure Digital (SD) card, inside the USB dongle. In some cases, a USB keyboard may include a port (e.g., card slot, USB port, or another type of port) for accepting a smartcard. The BIOS may read a public certificate, a card identifier (ID), or both that are stored on the smartcard. The BIOS may compute a hash value of the public certificate, the card ID, or both and store the hash value in a non-volatile random-access memory (NV-RAM) or a similar type of memory. Subsequently, when the computing device is in a low-power state, the user may insert the smartcard into a port to wake the computing device (e.g., initiate the boot process). The BIOS may detect the insertion of the smartcard. For example, the BIOS may detect the insertion of the smartcard (i) in response to receiving an interrupt generated by the port into which the smartcard was inserted or (ii) by periodically (e.g., at a predetermined interval) polling the ports. After detecting the insertion of the smartcard, the BIOS may read a public certificate, a card identifier (ID), or both that are stored on the smartcard. The BIOS may compute a hash value of the public certificate, the card ID, or both and perform a comparison of the computed hash value to the previously stored hash value. If the BIOS is able to authenticate the smartcard, e.g., by determining that the computed hash value matches the previously stored hash value, then the BIOS may initiate the boot process (e.g., load drivers, load an operating system, and the like) of the computing device. If the BIOS is unable to authenticate the smartcard, e.g., by determining that the computed hash value does not match the previously stored hash value, then the BIOS may remain in the low-power state.

As another example, a user may enable a "wake-on keyboard" feature of a BIOS (e.g., UEFI), of a computing device. The BIOS may prompt the user to provide input (e.g., a password) comprised of a set of (e.g., one or more) key presses using a keyboard that is connected to a port (e.g., USB port) of the computing device. The BIOS may compute a hash value of the input (e.g., the password that includes a set of key presses) and store the hash value in a non-volatile random-access memory (NV-RAM) or a similar type of memory. Subsequently, when the computing device is in a low-power state, the user may type the input (e.g., the password) using the keyboard to wake the computing device (e.g., initiate the boot process). The BIOS may detect the input provided by the keyboard that is connected to a port of the device. For example, the BIOS may detect the input from the keyboard (i) in response to receiving an interrupt generated by the port to which the keyboard is connected or (ii) by periodically (e.g., at a predetermined interval) polling the ports, including the port to which the keyboard is connected. The BIOS may compute a hash value of the input and perform a comparison of the input to the previously stored input. If the BIOS is able to authenticate the input (e.g., password), e.g., by determining that the computed hash value matches the previously stored hash value, then the BIOS may initiate the boot process (e.g., load drivers, load an operating system, and the like) of the computing device. If the BIOS is unable to authenticate the input, e.g., the BIOS determines that that the computed hash value does not match the previously stored hash value, then the BIOS may remain in the low-power state.

As a further example, a user may enable a "wake-on biometric input" feature of a BIOS (e.g., UEFI), of a computing device. The BIOS may prompt the user to provide biometric input using a biometric input device, such as, for example, a fingerprint reader, a retinal scanner, a facial scanner (e.g., structured light scanner), a signature input device, or the like that is connected to a port (e.g., USB port) of the computing device. The BIOS may compute a hash value of the input (e.g., the data received from the biometric input device) and store the hash value in a non-volatile random-access memory (NV-RAM) or a similar type of memory. Subsequently, when the computing device is in a low-power state, the user may provide biometric input using the biometric input device to wake the computing device (e.g., initiate the boot process). The BIOS may detect the input provided by the keyboard that is connected to a port of the device. For example, the BIOS may detect the biometric input from the biometric input device (i) in response to receiving an interrupt generated by the port to which the biometric input device is connected or (ii) by periodically (e.g., at a predetermined interval) polling the ports, including the port to which the biometric input device is connected. The BIOS may compute a hash value of the input and perform a comparison of the input to the previously stored input. If the BIOS is able to authenticate the biometric input, e.g., by determining that the computed hash value matches the previously stored hash value, then the BIOS may initiate the boot process (e.g., load drivers, load an operating system, and the like) of the computing device. If the BIOS is unable to authenticate the input, e.g., the BIOS determines that that the computed hash value does not match the previously stored hash value, then the BIOS may remain in the low-power state.

Of course, any combination of input, as described in the previous examples, may be used. For example, a user may enable a "wake-on" feature of a BIOS (e.g., UEFI), of a computing device and select the type of input that the user is to provide to wake the computing device. For example, the type of input may include (i) inserting a smartcard into a card reader (or another type of port) connected to the computing device and (ii) providing a password using a keyboard connected to a port of the computing device. As another example, the type of input may include (i) providing biometric input using a biometric input device connected to a port of the computing device and (ii) providing a password using a keyboard connected to a port of the computing device. As yet another example, the type of input may include (i) providing biometric input using a biometric input device connected to a port of the computing device and (ii) inserting a smartcard into a card reader (or another type of port) connected to the computing device. The BIOS may prompt the user to provide the input, compute a hash value of the input, and store the hash value in a non-volatile random-access memory (NV-RAM) or a similar type of memory. Subsequently, when the computing device is in a low-power state, the user may provide the type of input selected in the BIOS. The BIOS may detect the input, compute a hash value of the input, and perform a comparison of the input to the previously stored input. If the BIOS determines that the computed hash value matches the previously stored hash value, then the BIOS may initiate the boot process (e.g., load drivers, load an operating system, and the like) of the computing device. If the BIOS determines that that the computed hash value does not match the previously stored hash value, then the BIOS may remain in the low-power state.

As a first example, a computing device may include a memory storing instructions that are executable by one or more processors to perform various operations. For example, the operations may include entering a BIOS user interface (UI) of a computing device and setting (e.g., based on a user selection) a "secure wake-on using smartcard" setting of the BIOS. The operations may include determining that a smartcard has been connected to a port of the computing device, loading a card driver (e.g., a chip card interface device (CCID) driver), and reading, using the card driver, at least a portion of data (e.g., a public certificate, a card identifier that uniquely identifies the smartcard, or both) stored on the smartcard. The operations may include computing a preliminary hash value based at least in part on the data and storing the preliminary hash value in a non-volatile memory of the computing device to create a stored hash. The operations may include determining that the computing device is in a low-power state. The operations may include determining that a smartcard has been connected to a port of the computing device. Determining that the smartcard has been connected to the port of the computing device may include (1) determining that a universal serial bus (USB) dongle comprising the smartcard has been inserted into a USB port of the computing device or (2) determining that the smartcard has been inserted into (i) a card reader port of the computing device or (ii) a card reader port of a keyboard that is connected to a universal serial bus (USB) port of the computing device. The operations may include loading the card driver, and reading, using the card driver, at least a portion of the data (e.g., a public certificate, a card identifier that uniquely identifies the smartcard, or both) stored on the smartcard. The operations may include computing a hash value based at least in part on the data. The operations may include performing a comparison of the hash value to the stored hash. If the hash value matches the previously stored hash, then the operations may include initiating a boot-up process of the computing device. For example, the boot-up process may transition the computing device from the low-power state to a power-on state. If the hash value does not match the previously stored hash, then the operations may include resuming the low-power state.

As a second example, a computing device may include one or more processors and one or more non-transitory computer readable media storing instructions that are executable by the one or more processors to perform various operations. For example, the operations may include entering a BIOS UI of the computing device and enabling (e.g., in response to a user selection) a "secure wake-on using at least one input device" setting. The operations may include receiving input data from the at least one input device that is connected to at least one port of the computing device. The operations may include computing a preliminary hash value based at least in part on the input data and storing the preliminary hash value in a non-volatile memory of the computing device to create a stored hash. The at least one input device may include a keyboard and the input data may include a password comprised of a series of key presses of the keyboard. The at least one input device may include a retinal scanner and the input data may include retinal scan data. The at least one input device may include a fingerprint reader and the input data may include fingerprint scan data. The at least one input device may include a facial recognition scanner and the input data may include facial data. The operations may include determining that the computing device is in a low-power state and determining that input data has been received from the at least one input device that is connected to the at least one port of the computing device. The operations may include computing a hash value based at least in part on the input data and performing a comparison of the hash value to the previously stored hash. Based on the comparison, if the hash value matches the previously stored hash, then the operations may include initiating a boot-up process of the computing device. For example, the boot-up process may transition the computing device from the low-power state to a power-on state. Based on the comparison, if the hash value does not match the previously stored hash, then the operations may include resuming the low-power state.

FIG. 1 is a block diagram of a system 100 that includes computing device that can be booted based on input received from a port of the computing device, according to some embodiments. The system 100 may include a computing device 102. The computing device 102 may include an embedded controller 104, a BIOS 106 (e.g., UEFI), an operating system 108, and one or more applications 110. The embedded controller 104 is a microcontroller (e.g., a logic device) that handles various system tasks that the operating system (e.g., that is being executed by one or more central processing units (CPUs)) does not handle. The embedded controller 104 is always on when power is supplied to the motherboard. The embedded controller 104 may have has its own memory (e.g., random access memory (RAM)), e.g., independent of the memory used by the rest of the components of the computing device 102, and its own read only memory (ROM) in which instructions executed by the embedded controller 104 are stored.

A root of trust is a set of lower level functions that are trusted by the operating system (OS) 108. In the computing device 102, the root of trust starts with the embedded controller 104, and extends to the BIOS 106.

A platform controller hub (PCH) 112, at least one central process unit (CPU) 114, the embedded controller 104, and the BIOS 106 may be connected to each other via a bus 116. The PCH 112 may be connected to multiple ports 118, such as, for example, a universal serial bus (USB) port 120 and a card reader 122. In some cases, the card reader 122 may also be a USB port. The embedded controller 104 may include a software stack 136 (e.g., USB software stack) to enable the embedded controller 104 to access devices connected to the ports 118. For example, the software stack 136 may enable the embedded controller 104 to retrieve data stored on a device connected to one of the ports 118 and receive input data provided by (e.g., sent from) a device connected to one of the ports 118.

An input device 124 may be connected to the USB port 120. For example, the input device 124 may be a keyboard, a keypad, or a biometric input device. For example, the biometric input device may include a signature input pad, a retinal scanner, a fingerprint reader, a facial scanner (e.g., structured light), or the like. In some cases, the input device 124 may include a card reader 126. Of course, in some cases, a first input device, such as a keyboard, may be connected to a first USB port and a second input device, such as a biometric input device, may be connected to a second USB port of the ports 118.

A smartcard 128 may be inserted into either the card reader 122 or the card reader 126. The smartcard 128 is a credit card sized card with an embedded integrated circuit. The smartcard 128 may include a pattern of metal contacts to electrically connect to the internal chip or the smartcard 128 may be contactless. The smartcard 128 may be used to authenticate a user. For example, the smartcard 128 may provide strong security authentication for single sign-on (SSO). For example, the smartcard 128 may include non-volatile memory that can be used to store credentials, such as a public certificate 130, a unique card identifier (ID) 132, another type of credential, or any combination thereof. The public certificate 130 may be part of a public-key infrastructure (PKI). For example, the public certificate 120 may be an electronic document used to prove the ownership of a public key and may include information about the public key, information about the identity of its owner, and the digital signature of an entity that has verified the certificate's contents (e.g., the issuer). The card ID 132 may be an identifier that uniquely identifies the smartcard 128 from other smartcards.

At any particular time, the computing device 102 may have a particular one of states 160. The states 160 may include low-power states, such as hibernate 162 and power-off 164, in addition to a power-on 166 state. Of course, the states 160 may include other types of states. In a low-power state (e.g., hibernate 162 or power-off 164), the computing device 102 may draw a relatively small amount of power compared to the power-on state 162 because most components of the computing device 102 may be inactive, except for the embedded controller 104. In a low-power state, the embedded controller 104 may be active (e.g., polling the ports 118 or waiting for an interrupt 134). In the power-off 164, the applications 110 and the operating system 108 may shut down without any information being saved. Before transitioning from the power-on 166 to the hibernate 162, the operating system 108 may save information (e.g., in NV-RAM), such as, for example, a particular set of the applications 110 that are executing, a particular state associated with the particular set of applications 110, which particular files and folders are open, contents of the random-access memory (RAM), and the like. When the computing device 102 transitions from the hibernate 162 to the power-on 166, the operating system 108 may restore, based on the saved information, the computing device 102 back to a pre-transition state. For example, when transitioning from the hibernate 162 to the power-on 166, the operating system 108 may, based on the saved information, resume executing the particular set of the applications 110, restore the particular state associated with each application of the particular set of the applications 110, restore the particular files and folders that were open, restore the contents of the RAM, and the like.

A user may enter into a user interface (UI) 148 of the BIOS 106 (e.g., by selecting a particular key, such as an F2 key, an F12 key, a backspace key, a delete key, or another key or key combination of a keyboard). The UI 148 may provide the user with the ability to modify settings 150 of the BIOS 106. For example, the user may modify the settings 150 to enable a wake-on 152 setting. The wake-on 152 setting may include an option to (i) use a card 154 (e.g., the smartcard 128), (ii) provide a password 156 using the input device 124 (e.g., a keyboard) connected to one of the ports 118, (iii) provide biometric input 158 using a biometric input device (e.g., the input device 124), or any combination thereof. For example, a user may select one or more of the options: card 154, password 156, or biometric 158. To illustrate, selecting card 154 and password 156 may enable the computing device 102 to be woken using the smartcard 128 in combination with entering a set of (one or more) key presses of a keyboard (e.g., the input device 124).

For example, if the user enters the settings 152 and selects the wake-on 152 and the card 154 option, then the BIOS 106 may prompt the user to connect (e.g., insert) the smartcard 128 into a port (e.g., one of the ports 118 or the card reader 126) connected to the computing device 102. The BIOS 106 may load a card driver 138, such as a CCID driver (or similar) to read contents of the smartcard 128. For example, the BIOS 106 may use the card driver 138 to read the public certificate 130, the card ID 132, or both from the smartcard 128. The BIOS 106 may use a hashing function 142 to compute a preliminary hash value of the public certificate 130, the card ID 132, or both and store the preliminary hash value as a stored hash 146 in NV-RAM (or a similar type of memory). When the computing device 102 is in a low-power state (e.g., hibernate 162 or power-off 164), the user may desire to wake (e.g., boot-up and place in the power-on state 162) the computing device 102. The user may insert the smartcard 128 into one of the ports 118 (e.g., the card reader 122 or 126) to initiate the boot process and transition the computing device 102 from the low-power state (e.g., hibernate 162 or power-off 164) to the power-on state 162. The embedded controller 104 may detect that the smartcard 128 has been connected to one of the ports 118. For example, the embedded controller 104 may detect the insertion of the smartcard 128 (i) in response to receiving an interrupt 134 generated by the PCH 112 or (ii) by periodically (e.g., at a predetermined time interval) polling the ports 118. After detecting the insertion of the smartcard 128 into one of the ports 118, the embedded controller 104 may instruct the BIOS 106 to load the card driver 138 to read data, such as the public certificate 130, the card ID 132, or both, stored on the smartcard 128. The embedded controller 104 may use the hashing function 142 to compute a hash value 144 of the data, such as the public certificate 130, the card ID 132, or both, and perform a comparison of the computed hash value 144 to the previously stored hash value 146. If the embedded controller 104 determines that the computed hash value 144 matches the previously stored hash value 146, then the embedded controller 104 may instruct the BIOS 108 to initiate the boot process (e.g., load drivers, load the operating system 108, and the like) of the computing device 102. If the embedded controller 104 determines that the computed hash value 144 does not match the previously stored hash value 146, then the embedded controller 104 may keep the computing device 102 in the low-power state (e.g., hibernate 162 or power-off 164).

As another example, if the user enters the settings 152 and selects the wake-on 152 and the password 156 option, then the BIOS 106 may prompt the user to provide input data 140 from the input device 124. To illustrate, the user may use a keyboard (e.g., the input device 124) to provide a series of key presses (e.g., the input data 140). The BIOS 106 may use the hashing function 142 to compute a preliminary hash value of the input data 140 and store the preliminary hash value as the stored hash 146 in NV-RAM (or a similar type of memory). When the computing device 102 is in a low-power state (e.g., hibernate 162 or power-off 164), the user may desire to wake (e.g., boot-up and place in the power-on state 162) the computing device 102. The user may use the keyboard (e.g., the input device 124) to provide a series of key presses (e.g., the input data 140) to initiate the boot process and transition the computing device 102 from the low-power state (e.g., hibernate 162 or power-off 164) to the power-on state 162. The embedded controller 104 may detect that input data 140 has been received from the input device 124 that is connected to one of the ports 118. For example, the embedded controller 104 may detect the input data 140 (i) in response to receiving the interrupt 134 or (ii) by periodically (e.g., at a predetermined time interval) polling the ports 118. After detecting the input data 140 provided by the input device 124, the embedded controller 104 may use the hashing function 142 to compute the hash value 144 of input data 140 and perform a comparison of the computed hash value 144 to the previously stored hash value 146. If the embedded controller 104 determines that the computed hash value 144 matches the previously stored hash value 146, then the embedded controller 104 may instruct the BIOS 108 to initiate the boot process (e.g., load drivers, load the operating system 108, and the like) of the computing device 102. If the embedded controller 104 determines that the computed hash value 144 does not match the previously stored hash value 146, then the embedded controller 104 may keep the computing device 102 in the low-power state (e.g., hibernate 162 or power-off 164).

As yet another example, if the user enters the settings 152 and selects the wake-on 152 and the biometric 158 option, then the BIOS 106 may prompt the user to provide biometric input data 140 from the input device 124. To illustrate, the user may use a biometric device (e.g., the input device 124) to provide biometric data (e.g., the input data 140), such as a fingerprint scan, a retinal scan, a facial scan, or the like. The BIOS 106 may use the hashing function 142 to compute a preliminary hash value of the input data 140 and store the preliminary hash value as the stored hash 146 in NV-RAM (or a similar type of memory). When the computing device 102 is in a low-power state (e.g., hibernate 162 or power-off 164), the user may desire to wake (e.g., boot-up and place in the power-on state 162) the computing device 102. The user may use the biometric device (e.g., the input device 124) to provide biometric data (e.g., the input data 140) to initiate the boot process and transition the computing device 102 from the low-power state (e.g., hibernate 162 or power-off 164) to the power-on state 162. The embedded controller 104 may detect that input data 140 (e.g., biometric data) has been received from the input device 124 (e.g., biometric input device) that is connected to one of the ports 118. For example, the embedded controller 104 may detect the input data 140 (i) in response to receiving the interrupt 134 or (ii) by periodically (e.g., at a predetermined time interval) polling the ports 118. After detecting the input data 140 provided by the input device 124, the embedded controller 104 may use the hashing function 142 to compute the hash value 144 of input data 140 and perform a comparison of the computed hash value 144 to the previously stored hash value 146. If the embedded controller 104 determines that the computed hash value 144 matches the previously stored hash value 146, then the embedded controller 104 may instruct the BIOS 108 to initiate the boot process (e.g., load drivers, load the operating system 108, and the like) of the computing device 102. If the embedded controller 104 determines that the computed hash value 144 does not match the previously stored hash value 146, then the embedded controller 104 may keep the computing device 102 in the low-power state (e.g., hibernate 162 or power-off 164).

Of course, the user may modify the settings 150 and select one or more of the wake-on 152 options: card 154, password 156, or biometric 158. For example, if the user selects card 154 and password 156, then the embedded controller 104 may determine the stored hash 146 based on the input data 140 (e.g., password) and the certificate 130. If the user selects card 154 and biometric 158, then the embedded controller 104 may determine the stored hash 146 based on the input data 140 (e.g., biometric data) and the certificate 130, and so on.

Thus, a user may enter a BIOS UI of a computing device and enable a wake-on setting to use one or more of a smartcard, a password, or biometric data. Depending on the selected wake-on option(s), the BIOS UI may prompt the user to insert a smartcard into a port of the computing device, enter a password (comprising a series of key presses) using a keyboard connected to one of the ports of the computing device, provide biometric data using a biometric input device, or any combination thereof. For a smartcard, the BIOS UI may load a card driver (e.g., CCID driver) and read a certificate and/or a card ID of the card. The BIOS UI may determine (e.g., compute) a hash of the certificate, the card ID, the password, the biometric data, or any combination thereof, and store the hash to create a stored hash. At a later point in time, e.g., after the computing device has transitioned from a power-on state to a low-power state, such as hibernate or power-off, the user may desire to wake the computing device, e.g., transition the computing device from the low-power state to a power-on state. Depending on the BIOS wake-on settings, the user may insert the smartcard into a port (e.g., a card reader or other port) of the computing device, enter a series of key presses using a keyboard that is connected to one of the ports of the computing device, provide biometric data, or any combination thereof. An embedded controller may detect the insertion of the smartcard and/or receive the input data (e.g., from a keyboard and/or from a biometric input device), compute a hash value, and compare the hash value with the previously stored hash value. In the case of the smartcard, the embedded controller may load a card driver and read data stored on the smartcard, such as a certificate or card ID. If the embedded controller determines that the computed hash value matches the previously stored hash value, then the embedded controller may instruct the BIOS to initiate a boot process. If the embedded controller determines that the computed hash value does not match the previously stored hash value, then the embedded controller may ignore the smartcard insertion and/or input provided, causing the computing device to remain in the low-power state.

In the flow diagram of FIGS. 2, 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, 400, and 500, are described with reference to FIG. 1 as described above, although other models, frameworks, systems and environments may be used to implement these processes.

Figure 2:
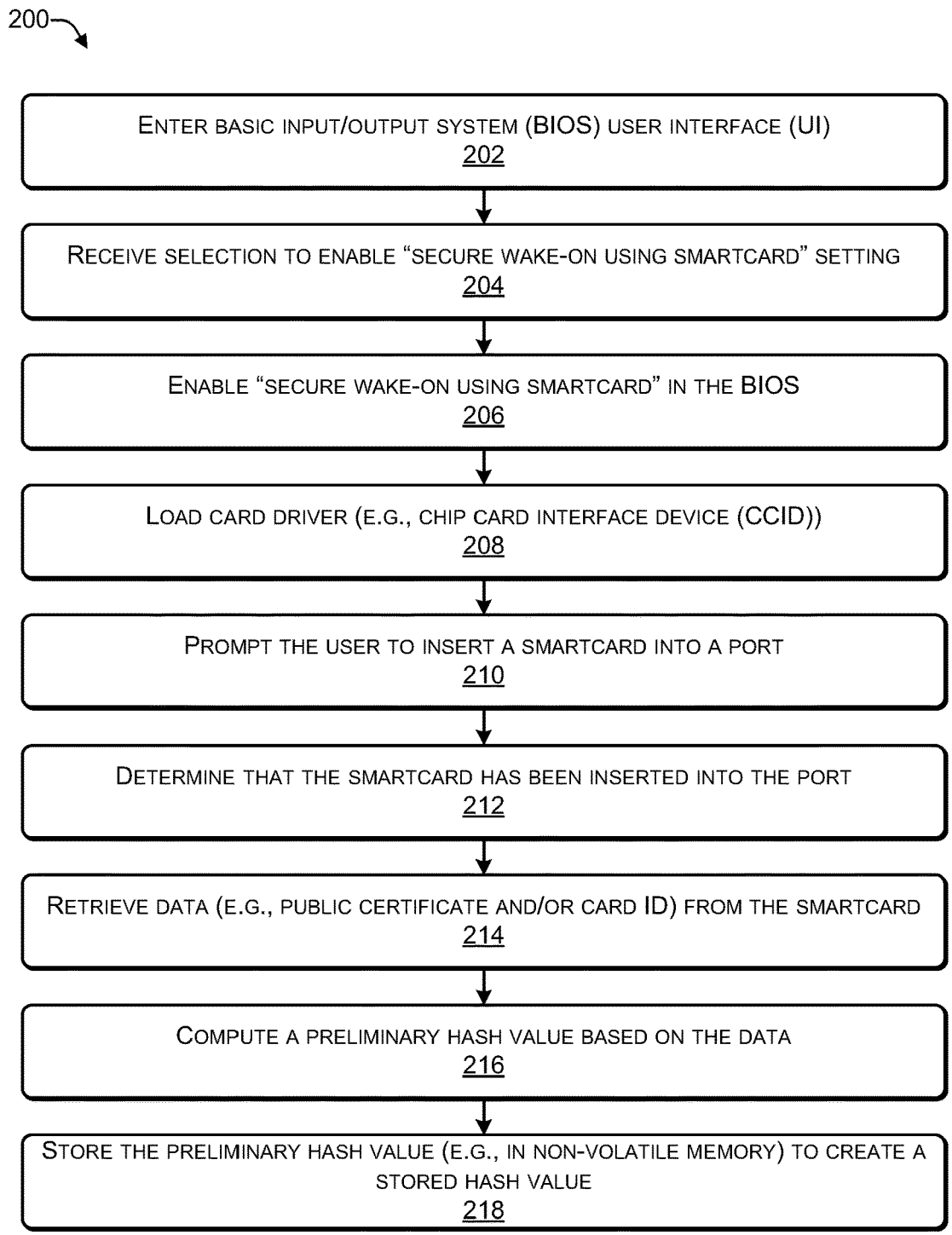
FIG. 2 is a flowchart of a process that includes enabling secure wake-on using a smartcard, according to some embodiments.

FIG. 2 is a flowchart of a process 200 that includes enabling secure wake-on using a smartcard, according to some embodiments. For example, the process 200 may be performed by one or more components, such as the BIOS 106, of the computing device 102 of FIG. 1.

At 202, the process may enter a UI (e.g., to modify the BIOS settings). For example, in FIG. 1, a user may select a particular key (e.g., F2, F12, backspace, delete, or another key) to enter into the UI 148 of the BIOS 106. The UI 148 may enable the user to modify the settings 150 of the BIOS 106.

At 204, the process may receive a selection to enable "secure wake-on using smartcard". At 206, the process may enable the "secure wake-on using smartcard" setting in the BIOS. At 208, the process may load a card driver, such as a CCID driver, to enable the BIOS to read information stored on a smartcard. At 210, the process may prompt the user to insert a smartcard into one of the ports of the computing device (or a device connected to one of the ports of the computing device). For example, in FIG. 1, the user may enter the settings 152 and select the wake-on 152 and the card 154 option. In response, the BIOS 106 may load the card driver 138, such as a CCID driver (or similar), to read contents of the smartcard 128. The BIOS 106 may prompt the user to connect (e.g., insert) the smartcard 128 into a port (e.g., one of the ports 118 or the card reader 126) connected to the computing device 102.

At 212, the process may determine that the smartcard has been inserted into one of the ports of the computing device (or a device connected to one of the ports of the computing device). At 214, the process may retrieve data (e.g., a public certificate, a card ID, or both) from the smartcard. At 216, the process may compute a preliminary hash value of the data. At 218, the process may store (e.g., in non-volatile memory) the preliminary hash value to create a stored hash value. For example, in FIG. 1, the user may insert the smartcard 128 into one of the ports 118 (e.g., the card reader 122 or 126). The BIOS 106 may detect that the smartcard 128 has been connected to one of the ports 118. For example, the BIOS 106 may detect (e.g., via the embedded controller 104) the insertion of the smartcard 128 (i) in response to receiving an interrupt 134 generated by the PCH 112 or (ii) by periodically (e.g., at a predetermined time interval) polling the ports 118. The BIOS 106 may use the card driver 138 to read data, such as the public certificate 130, the card ID 132, or both, from the smartcard 128. The BIOS 106 may use a hashing function 142 to compute a hash value of the data (e.g., the public certificate 130, the card ID 132, or both) and store (e.g., in non-volatile memory) the preliminary hash value as the stored hash 146.

Thus, a user may enter a BIOS UI of a computing device and enable a wake-on setting to use a smartcard. The BIOS UI may prompt the user to insert a smartcard into a port of the computing device. The BIOS UI may load a card driver (e.g., CCID driver) and read data, such as a certificate and/or a card ID, from the card. The BIOS UI may determine (e.g., compute) a hash of the certificate, the card ID, or both, and store the hash to create a stored hash. The stored hash may be used later to verify a user attempting to wake the computing device from a low-power state.

Figure 3:
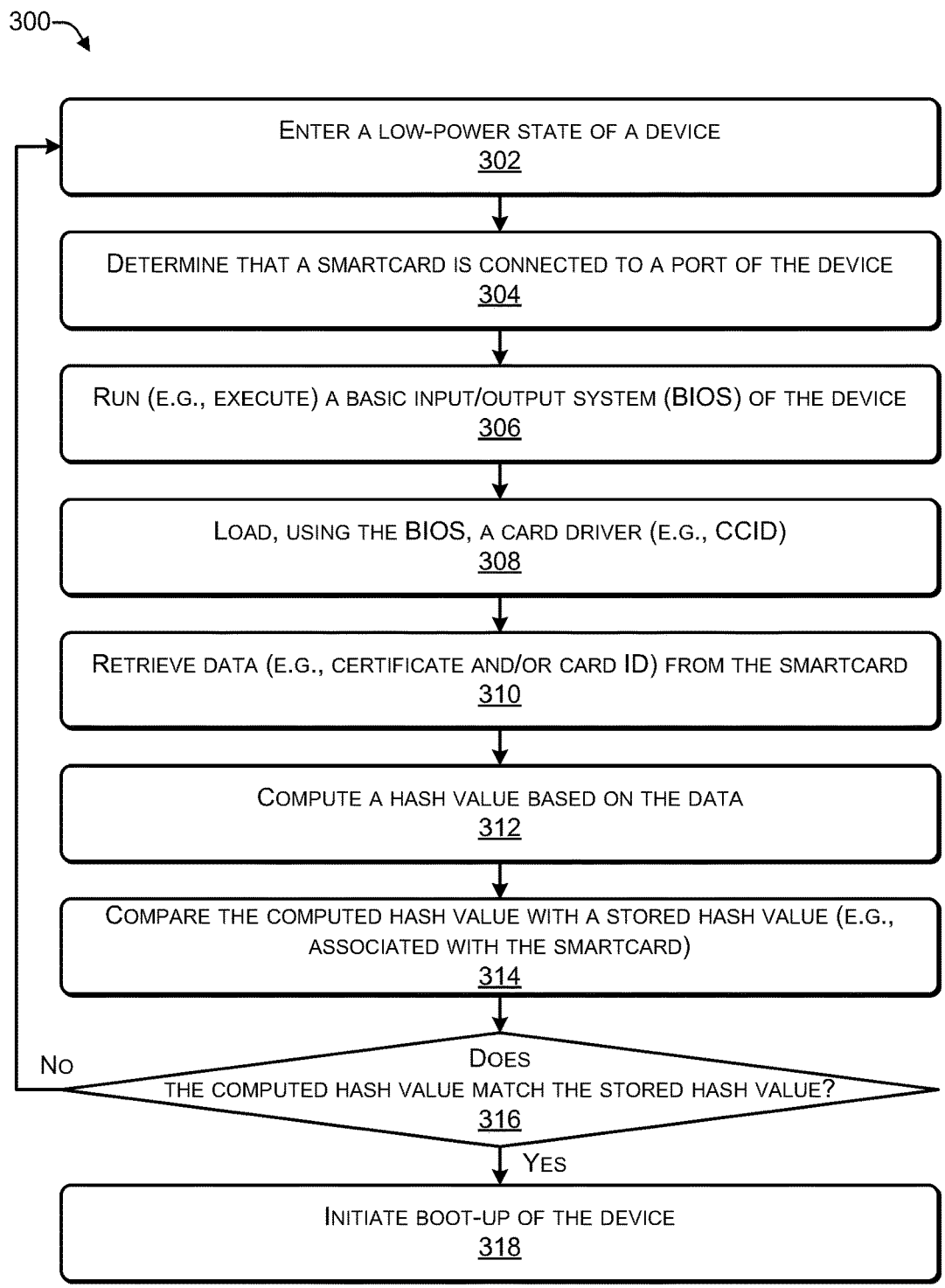
FIG. 3 is a flowchart of a process that includes determining that a smartcard is connected to a port of a device, according to some embodiments.

FIG. 3 is a flowchart of a process 300 that includes determining that a smartcard is connected to a port of a device, according to some embodiments. For example, the process 300 may be performed by one or more components, such as the embedded controller 104 and/or the BIOS 106, of the computing device 102 of FIG. 1.

At 302, the process may enter a low-power state of a device. For example, in FIG. 1, the computing device 102 may be in a low-power state (e.g., hibernate 162 or power-off 164). The user may desire to wake (e.g., boot-up and transition to the power-on state 162) the computing device 102. The user may insert the smartcard 128 into one of the ports 118 (e.g., the card reader 122 or 126) to initiate the boot process and transition the computing device 102 from the low-power state (e.g., hibernate 162 or power-off 164) to the power-on state 162.

At 304, the process may determine that a smartcard is connected to a port of the device. At 306, a BIOS of the device may be executed. At 308, the process may load (e.g., using the BIOS) a card driver (e.g., CCID driver). At 310, the process may retrieve (e.g., read) data (e.g., certificate and/or card ID) from the smartcard. For example, in FIG. 1, the embedded controller 104 may detect that the smartcard 128 has been connected to one of the ports 118. To illustrate, the embedded controller 104 may detect the insertion of the smartcard 128 (i) in response to receiving an interrupt 134 generated by the PCH 112 or (ii) by periodically (e.g., at a predetermined time interval) polling the ports 118. After detecting the insertion of the smartcard 128 into one of the ports 118, the embedded controller 104 may instruct the BIOS 106 to load the card driver 138 to read data, such as the public certificate 130, the card ID 132, or both, stored on the smartcard 128.

At 312, the process may compute a hash value based on the data (e.g., certificate and/or card ID) retrieved from the smartcard. At 314, the computed hash value may be compared with a stored hash value (e.g., associated with the smartcard). At 316, a determination may be made whether the computed hash value matches the stored hash value. If a determination is made, at 316, that "yes" the computed hash value matches (e.g., is identical in value to) the stored hash value, then the process may proceed to 318, where the process may initiate boot-up of the device (e.g., initiating a boot-up sequence in the BIOS to load the operating system). If a determination is made, at 316, that "no" the computed hash value does not match the stored hash value, then the process may proceed to 302 and enter (e.g., remain) in the low-power state. For example, in FIG. 1, the embedded controller 104 may use the hashing function 142 to compute the hash value 144 of the data read from the smartcard 128, such as the public certificate 130, the card ID 132, or both, and perform a comparison of the computed hash value 144 to the previously stored hash value 146. If the embedded controller 104 determines that the computed hash value 144 matches the previously stored hash value 146, then the embedded controller 104 may instruct the BIOS 108 to initiate the boot process (e.g., execute a boot process code in the BIOS to load drivers, load the operating system 108, and the like) of the computing device 102. If the embedded controller 104 determines that the computed hash value 144 does not match the previously stored hash value 146, then the embedded controller 104 may cause the computing device 102 to remain in the low-power state (e.g., hibernate 162 or power-off 164).

Thus, after a device has transitioned from a power-on state to a low-power state, such as hibernate or power-off, a user may desire to wake the computing device, e.g., transition the computing device from the low-power state to a power-on state. The user may insert a smartcard into a port (e.g., a card reader or other port) of the computing device. An embedded controller may detect the insertion of the smartcard, load a card driver, and read data stored in the smartcard. The embedded controller may compute a hash value based on the data read from the smartcard and compare the hash value with the previously stored hash value. If the embedded controller determines that the computed hash value matches the previously stored hash value, then the embedded controller may instruct the BIOS to initiate a boot process. If the embedded controller determines that the computed hash value does not match the previously stored hash value, then the embedded controller may ignore the smartcard insertion and/or input provided, causing the computing device to remain in the low-power state. The embedded controller may resume waiting for an interrupt from the ports or polling the ports to detect the insertion of a smartcard.

Figure 4:
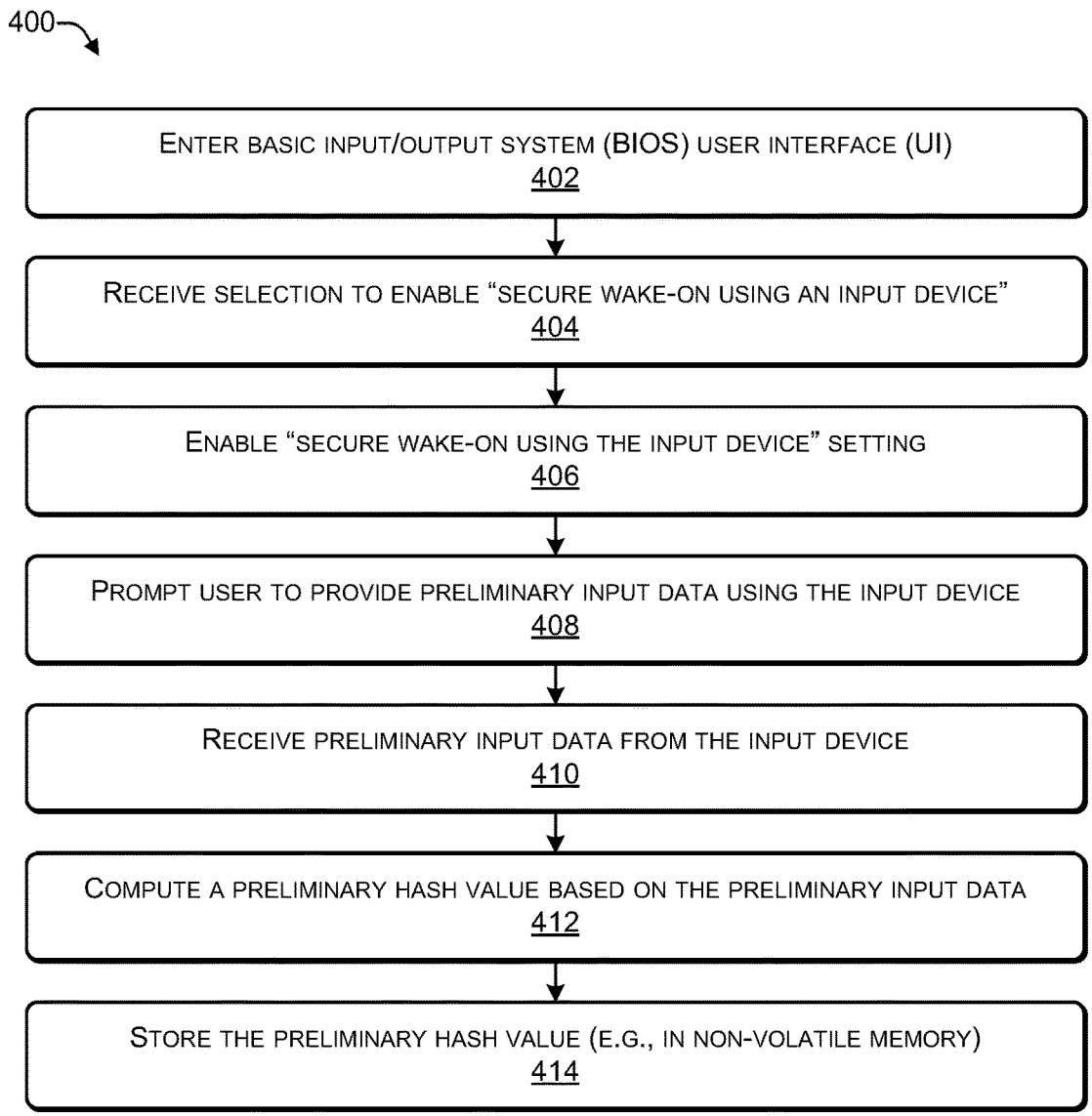
FIG. 4 is a flowchart of a process that includes enabling secure wake-on using an input device, according to some embodiments.

FIG. 4 is a flowchart of a process 400 that includes enabling secure wake-on using an input device, according to some embodiments. For example, the process 400 may be performed by one or more components, such as the BIOS 106, of the computing device 102 of FIG. 1.

At 402, the process may enter a UI of a BIOS (e.g., to modify the BIOS settings). For example, in FIG. 1, a user may select a particular key (e.g., F2, F12, backspace, delete, or another key) to enter into the UI 148 of the BIOS 106. The UI 148 may enable the user to modify the settings 150 of the BIOS 106.

At 404, the process may receive a selection to enable "secure wake-on using an input device". At 406, the process may enable the "secure wake-on using an input device" setting in the BIOS. At 408, the process may prompt the user to provide preliminary input data using an input device. For example, in FIG. 1, the user may enter the settings 152 and select the wake-on 152 and the password 156 setting and/or the biometric 158 setting. In response, the BIOS 106 may prompt the user to provide the input data 140 using the input device 124. For example, when the input device 124 is a keyboard, the user may provide the input data 140 that includes a series of key presses (e.g., a password). As another example, when the input device 124 is a biometric input device, the user may use the input device 124 to provide the input data 140 that includes biometric data (e.g., fingerprint scan, retinal scan, or the like).

At 410, the process may receive preliminary input data from the input device. At 412, the process may compute a preliminary hash value based on the preliminary input data. At 414, the process may store (e.g., in non-volatile memory) the preliminary hash value to create a stored hash value. For example, in FIG. 1, the user may provide the input data 140 (e.g., a series of key presses or biometric data) using the input device (e.g., a keyboard or a biometric input device). The BIOS 106 may use the hashing function 142 to compute a preliminary hash value of the input data 140 (and store (e.g., in non-volatile memory) the preliminary hash value to create the stored hash 146.

Thus, a user may enter a BIOS UI of a computing device and enable a wake-on setting to use an input device. The BIOS UI may prompt the user to provide input data using an input device connected to one of the ports of the computing device. The BIOS may receive input data, such as (i) a series of key presses (e.g., a password) from a keyboard or (ii) biometric data from a biometric input device (e.g., fingerprint reader, retinal scanner, or the like). The BIOS may use a hashing function to compute a hash value based on the input data and store the hash value in non-volatile memory to create a stored hash value. The stored hash may be used later to verify a user attempting to wake the computing device from a low-power state.

Figure 5:
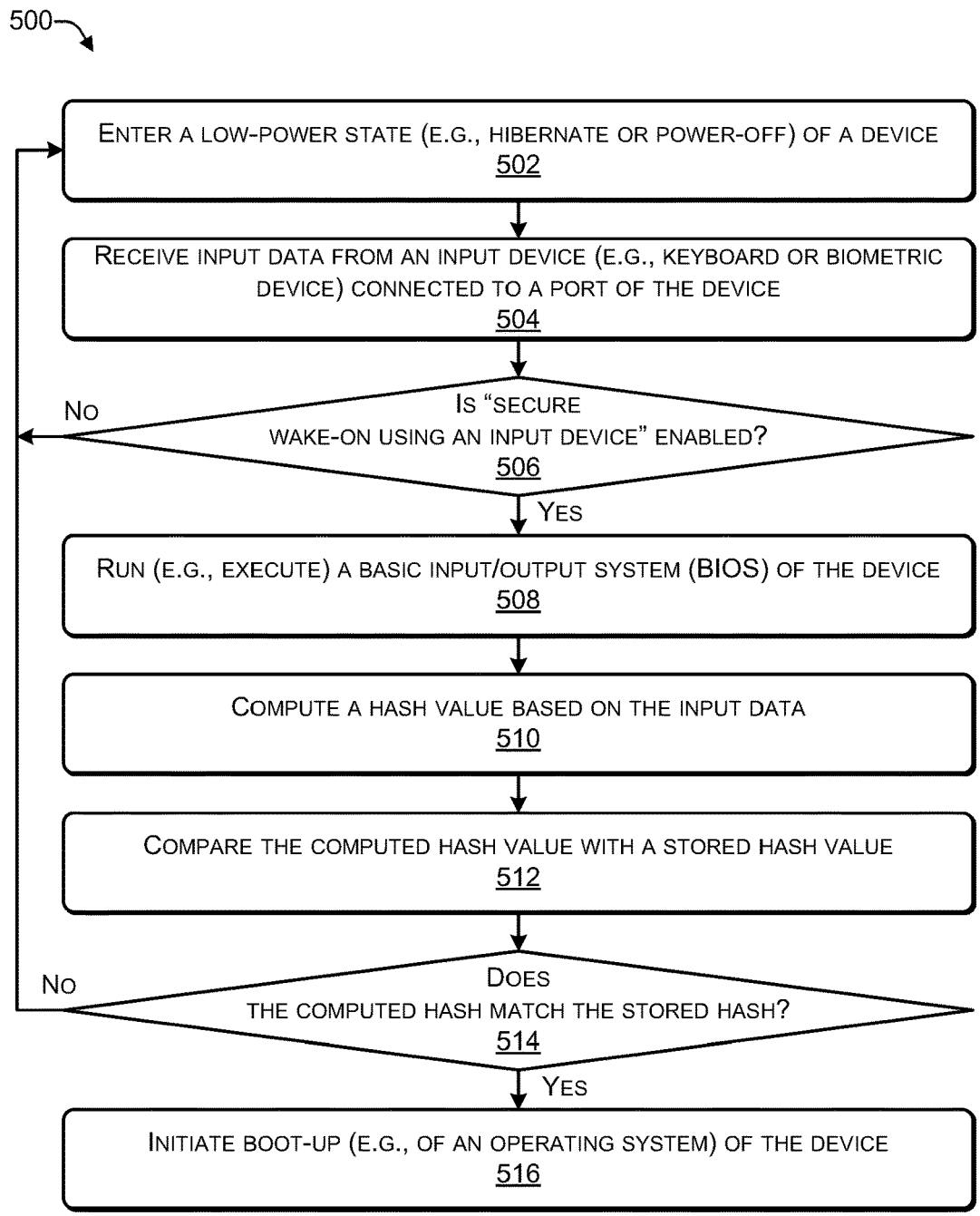
FIG. 5 is a flowchart of a process that includes receiving input from an input device connected to a port of a device, according to some embodiments.

FIG. 5 is a flowchart of a process 500 that includes receiving input from an input device connected to a port of a device, according to some embodiments. For example, the process 500 may be performed by one or more components, such as the embedded controller 104 and/or the BIOS 106, of the computing device 102 of FIG. 1.

At 502, the process may enter a low-power state of a device. For example, in FIG. 1, the computing device 102 may enter a low-power state (e.g., hibernate 162 or power-off 164) from the power-on state 162. The user may desire to wake (e.g., boot-up and transition to the power-on state 162) the computing device 102.

At 504, the process may determine that input data has been received from an input device connected to a port of the device. At 506, a determination may be made whether a "secure wake-on using an input device" setting of the BIOS is enabled. If a determination is made, at 506, that "no" the "secure wake-on using an input device" setting of the BIOS is not enabled, then the process may proceed to 502 and remain in the low-power state. If a determination is made, at 506, that "yes" the "secure wake-on using an input device" setting of the BIOS is enabled, then the process may proceed to 508.

At 508, the process may run (e.g., execute) a BIOS of the device. At 510, the process may compute a hash value based on the input data (e.g., a series of key presses or biometric data) received from the input device. At 512, the computed hash value may be compared with a stored hash value. At 514, a determination may be made whether the computed hash value matches the stored hash value. If a determination is made, at 514, that "yes" the computed hash value matches (e.g., is identical in value to) the stored hash value, then the process may proceed to 516, where the process may initiate boot-up of the device (e.g., initiating a boot-up sequence in the BIOS to load the operating system). If a determination is made, at 516, that "no" the computed hash value does not match the stored hash value, then the process may proceed to 502 and enter (e.g., remain) in the low-power state. For example, in FIG. 1, the embedded controller 104 may use the hashing function 142 to compute the hash value 144 of the input data 140 received from the input device 124, and perform a comparison of the computed hash value 144 to the previously stored hash value 146. If the embedded controller 104 determines that the computed hash value 144 matches the previously stored hash value 146, then the embedded controller 104 may instruct the BIOS 108 to initiate the boot process (e.g., execute a boot process code in the BIOS to load drivers, load the operating system 108, and the like) of the computing device 102. If the embedded controller 104 determines that the computed hash value 144 does not match the previously stored hash value 146, then the embedded controller 104 may cause the computing device 102 to remain in the low-power state (e.g., hibernate 162 or power-off 164).

Thus, after a device has transitioned from a power-on state to a low-power state, such as hibernate or power-off, a user may desire to wake the computing device, e.g., transition the computing device from the low-power state to a power-on state. The user may provide input data using an input device (e.g., keyboard, biometric input device, or the like) connected to a port of the computing device. An embedded controller may detect the input data, wake the BIOS, and instruct the BIOS to compute a hash value based on the input data received from the input device. If the embedded controller determines that the computed hash value matches the previously stored hash value, then the embedded controller may instruct the BIOS to initiate a boot process. If the embedded controller determines that the computed hash value does not match the previously stored hash value, then the embedded controller may ignore the input data, causing the computing device to remain in the low-power state. The embedded controller may resume waiting to receive input data from a device connected to the ports of the computing device.

Figure 6:
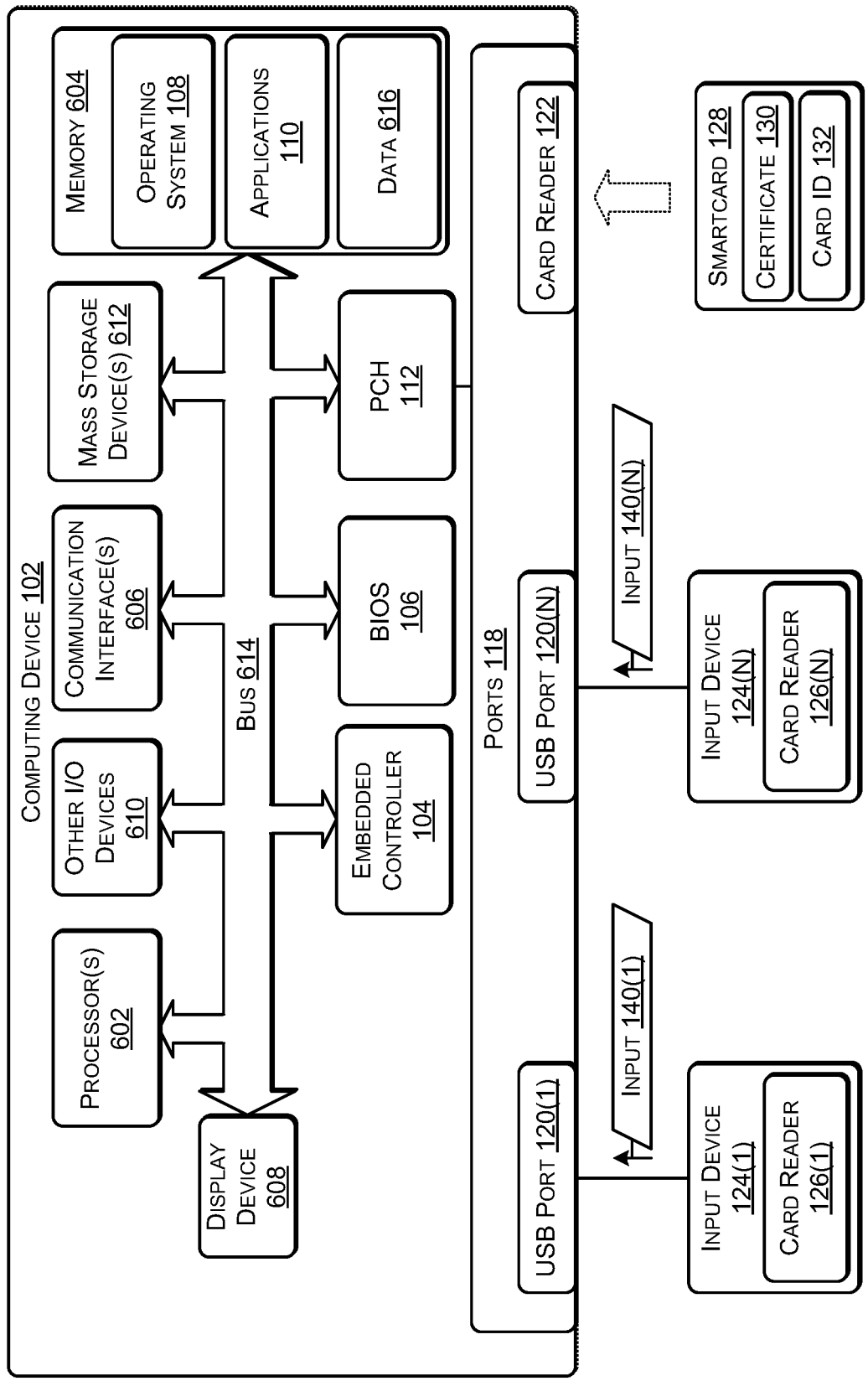
FIG. 6 illustrates an example configuration of a computing device that can be used to implement the systems and techniques described herein.

FIG. 6 illustrates an example configuration of the computing device 102 that can be used to implement the systems and techniques described herein. The computing device 102 may include one or more processors 602 (e.g., the CPU 114, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 102 may include one or more communication interfaces 606 for exchanging data via a network. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth. The computer storage media, such as memory 604 and mass storage devices 612, may be used to store software and data, such as, for example, the operating system 108, the applications 110, and data 616.

The computing device 102 may include multiple ports 118, including USB port 102(1) to USB port 102(N) (N>0) and at least one card reader port 122. One or more input devices may be connected to the ports 118. For example, the input device 124(1) may be connected to the USB port 120(1) and the input device 124(N) may be connected to the USB port 120(N). For example, the input device 124(1) may be a keyboard while the input device 124(N) may be a biometric input device, such as a fingerprint reader or a retinal scanner. In some cases, one or more of the input devices 124 may include a card reader. For example, the input device 124(1) may include the card reader 126(1) and the input device 124(N) may include the card reader 126(N).

Thus, a user may enter the BIOS 106 and enable a wake-on setting to use one or more of a smartcard, a password, or biometric data to securely wake the computing device 102. Depending on the selected wake-on option(s), the BIOS 106 may prompt the user to insert the smartcard 128 into one of the ports 118, enter a password (comprising a series of key presses) using a keyboard (e.g., input device 124(1)) connected to one of the ports 118, provide biometric data using a biometric input device (e.g., input device 124(N)) connected to one of the ports 118, or any combination thereof. For a smartcard, the BIOS 106 may load a card driver (e.g., CCID driver) and read a certificate and/or a card ID stored on the smartcard. The BIOS 106 may determine (e.g., compute) a hash of the certificate, the card ID, the password, the biometric data, or any combination thereof, and store the hash to create a stored hash.

At a later point in time, e.g., after the computing device 102 has transitioned from a power-on state to a low-power state (e.g., hibernate or power-off), the user may desire to wake the computing device 102, e.g., transition the computing device from the low-power state to a power-on state. Depending on the wake-on settings of the BIOS 106, the user may insert the smartcard 128 into one of the ports 118 (e.g., the card reader 122), enter a series of key presses using a keyboard (e.g., input device 124(1)) that is connected to one of the ports 118, provide biometric data from a biometric input device (e.g., input device 124(N)) connected to one of the ports 118, or any combination thereof. The embedded controller 104 may detect the insertion of the smartcard 128, load a card driver (e.g., CCID driver), and read data stored on the smartcard 128. The embedded controller 104 may receive the input data 140(1) (e.g., key press sequence) received from the input device 124(1) (e.g., a keyboard), the input data 140(N) received from the input device 124(N) (e.g., a biometric input device) or both. The BIOS 106 may compute a hash value based on the data read from the smartcard 128 and/or the input data 140, and compare the hash value with the previously stored hash value. If the embedded controller 104 determines that the computed hash value matches the previously stored hash value, then the embedded controller 104 may instruct the BIOS 106 to initiate a boot process. If the embedded controller 104 determines that the computed hash value does not match the previously stored hash value, then the embedded controller 104 may ignore the smartcard insertion and/or input provided, causing the computing device 102 to remain in the low-power state.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising providing a computing device having a first hash value previously stored thereon that is computed based at least in part on data stored on a designated user smartcard, and then:
   entering a low-power state of the computing device that has the first hash value previously stored thereon;
   then determining, by one or more processors, that the computing device is in the low-power state, and that a current user smartcard has been connected to a port of the computing device while the computing device is in the low-power state;
   then loading, by the one or more processors, a card driver;
   then reading, using the card driver being executed by the one or more processors, data stored on the connected current user smartcard;
   then computing, by the one or more processors, a second hash value based at least in part on the data stored on the connected current user smartcard;
   then performing, by the one or more processors, a comparison of the second hash value to the previously stored first hash value;
   then only upon determining, by the one or more processors and based on the comparison, that the second hash value matches the previously stored first hash value, initiating a boot-up of the computing device, and transitioning, by the one or more processors, the computing device from the low-power state to a power-on state.

2. The method of claim 1, further comprising:
then only upon determining, based on the comparison, that the second hash value does not match the previously stored first hash value, resuming the low-power state.

3. The method of claim 1, wherein the data stored on the designated user smartcard comprises at least one of:
a public certificate; or
a card identifier that uniquely identifies the designated user smartcard.

4. The method of claim 1, wherein the card driver comprises a chip card interface device driver.

5. The method of claim 1, wherein determining that the current user smartcard has been connected to the port of the computing device comprises:
determining that a universal serial bus (USB) dongle comprising the current user smartcard has been inserted into a USB port of the computing device.

6. The method of claim 1, wherein determining that the current user smartcard has been connected to the port of the computing device comprises:
determining that the current user smartcard has been inserted into a card reader port of a keyboard that is connected to a universal serial bus (USB) port of the computing device.

7. The method of claim 1, wherein the providing the computing device having the first hash value previously-stored thereon comprises creating and storing the first hash value on the computing device before the entering the low-power state of the computing device by:
enabling a secure wake-on using a smartcard setting of a basic input/output system (BIOS) of the computing device;
then determining that the designated user smartcard has been connected to the port, and loading the card driver;
then reading, using the card driver, the data stored on the designated user smartcard;
then computing the first hash value based at least in part on the data stored on the designated user smartcard; and
then storing the first hash value in a non-volatile memory of the computing device.

8. The method of claim 1, further comprising using an embedded controller of the computing device to perform the following while the computing device is in the low-power state with a basic input/output system (BIOS) of the computing device not awake:
determining that the computing device is in the low-power state, and that the current user smartcard has been connected to the port of the computing device while the computing device is in the low-power state;
loading of the card driver;
then computing of the second hash value based at least in part on the data stored on the connected current user smartcard;
then comparing the second hash value to the previously stored first hash value and then performing one of:
waking and instructing the basic input/output system (BIOS) of the computing device to initiate the boot-up of the computing device only if the embedded controller determines that the second hash value matches the previously stored first hash value, or
maintaining the low power state only if the embedded controller determines that the second hash value does not match the previously stored first hash value; and
then using the BIOS of the computing device to respond to instructions from the embedded controller by waking and performing the initiating of the boot-up of the computing device to transition the computing device from the low-power state to the power-on state only if the BIOS is awoken and instructed by the embedded controller to initiate the boot-up of the computing device.

9. A computing device comprising:
one or more processors;
a non-volatile memory having a first hash value previously stored thereon that is computed based at least in part on first user input data previously received from at least one input device that is connected to at least one port of the computing device; and
one or more non-transitory computer readable media storing first instructions executable by the one or more processors to perform first operations after the computing device has entered a low-power state with the first hash value previously stored on
the non-volatile memory, the first operations comprising:
determining that the computing device is in the low-power state, and that second user input data has been received while the computing device is in the low-power state from the at least one input device that is connected to the at least one port of the computing device,
then computing a second hash value based at least in part on the second user input data;
then performing a comparison of the second hash value to the previously stored first hash value, and
then only upon determining, based on the comparison, that the second hash value matches the previously stored first hash value, initiating a boot-up of the computing device, and transitioning the computing device from the low-power state to a power-on state;
where the first instructions are further executable by an embedded controller of the computing device to perform the first operations while the computing device is in the low-power state with a basic input/output system (BIOS) of the computing device not awake, the first operations further comprising
then comparing the second hash value to the previously stored first hash value and then performing one of:
waking and instructing the basic input/output system (BIOS) of the computing device to initiate the boot-up of the computing device only if the embedded controller determines that the second hash value matches the previously stored first hash value, or
maintaining the low power state only if the embedded controller determines that the second hash value does not match the previously stored first hash value, and
then using the BIOS of the computing device to respond to instructions from the embedded controller by waking and performing the initiating of the boot-up of the computing device to transition the computing device from the low-power state to the power-on state only if the BIOS is awoken and instructed by the embedded controller to initiate the boot-up of the computing device.

10. The computing device of claim 9, wherein:
the at least one input device comprises a keyboard; and
the first user input data comprises a series of key presses of the keyboard.

11. The computing device of claim 9, wherein:
the at least one input device comprises a retinal scanner; and
the first user input data comprises retinal scan data.

12. The computing device of claim 9, wherein:
the at least one input device comprises a fingerprint reader; and
the first user input data comprises fingerprint scan data.

13. The computing device of claim 9, wherein:
the at least one input device comprises a facial recognition scanner; and
the first user input data comprises facial data.

14. A computing device comprising:
one or more processors;
a non-volatile memory having a first hash value previously stored thereon that is computed based at least in part on first user input data previously received from at least one input device that is connected to at least one port of the computing device; and
one or more non-transitory computer readable media storing first instructions executable by the one or more processors to perform first operations after the computing device has entered a low-power state with the first hash value previously stored on the non-volatile memory, the first operations comprising:
determining that the computing device is in the low-power state, and that second user input data has been received while the computing device is in the low-power state from the at least one input device that is connected to the at least one port of the computing device,
then computing a second hash value based at least in part on the second user input data;
then performing a comparison of the second hash value to the previously stored first hash value, and
then only upon determining, based on the comparison, that the second hash value matches the previously stored first hash value, initiating a boot-up of the computing device, and transitioning the computing device from the low-power state to a power-on state;
where the one or more non-transitory computer readable media store second instructions executable by the one or more processors to perform second operations before the computing device has entered the low-power state, the second operations comprise:
enabling a secure wake-on using at least one input device setting of a basic input/output system (BIOS) of the computing device,
then receiving the first user input data from the at least one input device,
then computing the first hash value based at least in part on the first user input data, and
then storing the first hash value in the non-volatile memory of the computing device.

15. One or more non-transitory computer readable media storing first instructions executable by one or more processors of a computing device having a first hash value previously stored thereon that is computed based at least in part on first user input data previously received from at least one input device that is connected to at least one port of the computing device, the first instructions being executable to perform first operations after the computing device has entered a low-power state with the first hash value previously stored on the computing device, the first operations comprising:
determining that the computing device is in the low-power state, and that second user input data has been received while the computing device is in the low-power state from the at least one input device that is connected to the at least one port of the computing device;
then computing a second hash value based at least in part on the second user input data;
then performing a comparison of the second hash value to the previously stored first hash value;
then only upon determining, based on the comparison, that the second hash value matches the previously stored first hash value, initiating a boot-up of the computing device; and
transitioning the computing device from the low-power state to a power-on state;
where the first instructions are further executable by an embedded controller of the computing device to perform the first operations while the computing device is in the low-power state with a basic input/output system (BIOS) of the computing device not awake, the first operations further comprising:
then comparing the second hash value to the previously stored first hash value and then performing one of: waking and instructing the basic input/output system (BIOS) of the computing device to initiate the boot-up of the computing device only if the embedded controller determines that the second hash value matches the previously stored first hash value, or maintaining the low power state only if the embedded controller determines that the second hash value does not match the previously stored first hash value, and
then using the BIOS of the computing device to respond to the instructions from the embedded controller by waking and performing the initiating of the boot-up of the computing device to transition the computing device from the low-power state to the power-on state only if the BIOS is awoken and instructed by the embedded controller to initiate the boot-up of the computing device.

16. The one or more non-transitory computer readable media of claim 15, wherein:
the at least one input device comprises a keyboard; and
the first user input data comprises a series of key presses of the keyboard.

17. The one or more non-transitory computer readable media of claim 15, wherein:
the at least one input device comprises a retinal scanner; and
the first user input data comprises retinal scan data.

18. The one or more non-transitory computer readable media of claim 15, wherein:
the at least one input device comprises a biometric scanning device; and
the first user input data comprises biometric data.

19. One or more non-transitory computer readable media storing first instructions executable by one or more processors of a computing device having a first hash value previously stored thereon that is computed based at least in part on first user input data previously received from at least one input device that is connected to at least one port of the computing device, the first instructions being executable to perform first operations after the computing device has entered a low-power state with the first hash value previously stored on the computing device, the first operations comprising:
determining that the computing device is in the low-power state, and that second user input data has been received while the computing device is in the low-power state from the at least one input device that is connected to the at least one port of the computing device;

then computing a second hash value based at least in part on the second user input data;

then performing a comparison of the second hash value to the previously stored first hash value;

then only upon determining, based on the comparison, that the second hash value matches the previously stored first hash value, initiating a boot-up of the computing device; and transitioning the computing device from the low-power state to a power-on state;

wherein the one or more non-transitory computer readable media store second instructions executable by the one or more processors to perform second operations, before the computing device has entered the low-power state, the second operations comprising:

enabling a secure wake-on using at least one input device setting of a basic input/output system (BIOS) of the computing device, then receiving the first user input data from the at least one input device, then computing the first hash value based at least in part on the first user input data, and then storing the first hash value in a non-volatile memory of the computing device.

\* \* \* \* \*